US012684457B2

(12) United States Patent
Shekhar et al.

(10) Patent No.: US 12,684,457 B2
(45) Date of Patent: Jul. 14, 2026

(54) PROVIDING NETWORK SLICE ADMISSION CONTROL IN A MOBILE NETWORK ENVIRONMENT

(71) Applicant: Cisco Technology, Inc., San Jose, CA (US)

(72) Inventors: Ravi Shekhar, Pune (IN); Vimal Srivastava, Kannamangala (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 598 days.

(21) Appl. No.: 17/741,558

(22) Filed: May 11, 2022

(65) Prior Publication Data

US 2023/0370950 A1 Nov. 16, 2023

(51) Int. Cl.
*H04W 48/06* (2009.01)
*H04W 48/16* (2009.01)
(Continued)

(52) U.S. Cl.
CPC ........... *H04W 48/06* (2013.01); *H04W 48/16* (2013.01); *H04W 48/18* (2013.01); *H04W 60/04* (2013.01)

(58) Field of Classification Search
CPC ..... H04W 48/06; H04W 48/16; H04W 48/18; H04W 60/04; H04W 60/00
See application file for complete search history.

(56) References Cited

U.S. PATENT DOCUMENTS

2018/0227873 A1 8/2018 Vrzic et al.
2018/0302877 A1 10/2018 Bosch et al.
(Continued)

FOREIGN PATENT DOCUMENTS

EP 3 800 916 A1 4/2021
WO 2020/186145 A1 9/2020
(Continued)

OTHER PUBLICATIONS

ETSI, "5G, 5G System; Network Slice Admission Control Services; Stage 3, (3GPP TS 29.536 version 17.0.0 Release 17)", 3GPP, A Global Initiative, Technical Specification 129 536, May 2022, 65 pages.

(Continued)

*Primary Examiner* — Kevin T Bates
*Assistant Examiner* — Hector Reyes
(74) *Attorney, Agent, or Firm* — Edell, Shapiro & Finnan, LLC

(57) ABSTRACT

Presented herein are techniques to provide network slice admission control in a mobile network. In one example, a method may include obtaining, by an access management element of a mobile network, a registration request from a user equipment; determining, based on the registration request, for each of one or more network slices whether there is: available registration capacity for each network slice for the user equipment based on a registration quota configured for each network slice, available session capacity for each network slice based on a session quota configured for each network slice, and available bit rate capacity for each slice based on a maximum bit rate amount configured for each network slice; and providing, based on the determining, a registration indication to the user equipment for each network slice indicating whether the user equipment is or is not allowed registration for each of the network slices.

20 Claims, 4 Drawing Sheets

(51) Int. Cl.
H04W 48/18 (2009.01)
H04W 60/04 (2009.01)

(56) References Cited

U.S. PATENT DOCUMENTS

| | | | | |
|---|---|---|---|---|
| 2019/0254083 | A1 | 8/2019 | Stammers et al. | |
| 2020/0404718 | A1 | 12/2020 | Shekhar et al. | |
| 2021/0122261 | A1* | 4/2021 | Qiao | B60L 53/665 |
| 2021/0136674 | A1 | 5/2021 | Lee et al. | |
| 2021/0153157 | A1 | 5/2021 | Jeong et al. | |
| 2021/0168901 | A1* | 6/2021 | Kim | H04W 76/38 |
| 2021/0211974 | A1 | 7/2021 | Prabhakar et al. | |
| 2021/0212010 | A1 | 7/2021 | Lee et al. | |
| 2021/0297977 | A1 | 9/2021 | Prabhakar et al. | |
| 2021/0321325 | A1 | 10/2021 | Srivastava et al. | |
| 2021/0337383 | A1* | 10/2021 | Faccin | H04W 12/72 |
| 2021/0368395 | A1 | 11/2021 | Prabhakar et al. | |
| 2021/0368421 | A1* | 11/2021 | Venkataraman | H04W 76/11 |
| 2022/0007184 | A1 | 1/2022 | Ferdi et al. | |
| 2022/0104115 | A1* | 3/2022 | Jeong | H04W 48/06 |
| 2022/0264428 | A1* | 8/2022 | Li | H04W 28/0226 |
| 2022/0295380 | A1 | 9/2022 | Cakulev et al. | |
| 2022/0369204 | A1 | 11/2022 | Jeong et al. | |
| 2023/0030339 | A1* | 2/2023 | Zhu | H04W 48/06 |
| 2023/0051733 | A1* | 2/2023 | Shah | H04W 72/56 |
| 2023/0109272 | A1 | 4/2023 | Ryu et al. | |
| 2023/0120144 | A1 | 4/2023 | Kim | |
| 2023/0133453 | A1* | 5/2023 | Lee | H04W 48/02 |
| | | | | 370/329 |
| 2023/0156583 | A1 | 5/2023 | Murray et al. | |
| 2023/0164668 | A1 | 5/2023 | Kim | |
| 2023/0171598 | A1 | 6/2023 | Normann et al. | |
| 2023/0180169 | A1 | 6/2023 | Venkataraman et al. | |
| 2023/0189187 | A1 | 6/2023 | Velev et al. | |
| 2023/0189189 | A1 | 6/2023 | Venkataraman et al. | |
| 2023/0353457 | A1 | 11/2023 | Hou et al. | |
| 2024/0147575 | A1* | 5/2024 | Suh | H04W 76/10 |
| 2024/0187353 | A1 | 6/2024 | Chong et al. | |

FOREIGN PATENT DOCUMENTS

| | | | |
|---|---|---|---|
| WO | 2021063764 | A1 | 4/2021 |
| WO | 2021070028 | A1 | 4/2021 |
| WO | 2021119627 | A1 | 6/2021 |
| WO | 2021136599 | A1 | 7/2021 |

OTHER PUBLICATIONS

3GPP, "3rd Generation Partnership Project; Technical Specification Group Services and System Aspects; Study on enhancement of network slicing; Phase 2 (Release 17)," 3GPP TR 23.700-40 V17.0.0, Mar. 2021, 224 pages.

3GPP, "3rd Generation Partnership Project; Technical Specification Group Services and System Aspects; System architecture for the 5G System (5GS); Stage 2 (Release 17)," 3GPP TS 23.501 V17.2.0, Sep. 2021, 542 pages.

3GPP, "3rd Generation Partnership Project; Technical Specification Group Core Network and Terminals; Non-Access-Stratum (NAS) protocol for 5G System (5GS); Stage 3; (Release 17)," 3GPP TS 24.501 V17.4.1, Sep. 2021, 863 pages.

"5.3 Registration and Connection Management," iTecTec, https://itectec.com/spec/5-3-registration-and-connection-management/, retrieved Oct. 20, 2021, 17 pages.

EventHelix, "5G Standalone Access Registration," Medium, https://medium.com/5g-nr/5g-standalone-access-registration-fe80aa28d723, Nov. 17, 2018, 15 pages.

Dr. Williams Stallings, "Chapter 9: Core Network Functionality, Qos, and Network Slicing," 5G Wireless, Addison-Wesley, 2021, 55 pages.

3GPP, "5G; System Architecture for the 5G System (3GPP TS 23.501 version 15.3.0 Release 15)," Technical Specification, ETSI TS 123 501, V15.3.0, Sep. 2018, 227 pages.

GSMA, "Generic Network Slice Template," Official Document NG.116, Version 5.0, Jun. 2021, 68 pages.

3GPP, "3rd Generation Partnership Project; Technical Specification Group Services and System Aspects; Procedures for the 5G System (5GS); Stage 2 (Release 17)," Technical Specification, 3GPP TS 23.502 V17.4.0, Mar. 2022, 738 pages.

3GPP, "3rd Generation Partnership Project; Technical Specification Group Services and System Aspects; Procedures for the 5G System (5GS); Stage 2 (Release 16)," Technical Specification, 3GPP TS 23.502 V16.12.0, Mar. 2022, 615 pages.

3GPP, 3rd Generation Partnership Project; Technical Specification Group Services and System Aspects; System architecture for the 5G System (5GS); Stage 2 (Release 17), Technical Specification, 3GPP TS 23.501 V17.4.0, Mar. 2022, 567 pages.

3GPP, "3rd Generation Partnership Project; Technical Specification Group Services and System Aspects; System architecture for the 5G System (5GS); Stage 2 (Release 16)," Technical Specification, 3GPP TS 23.501 V16.12.0, Mar. 2022, 454 pages.

* cited by examiner

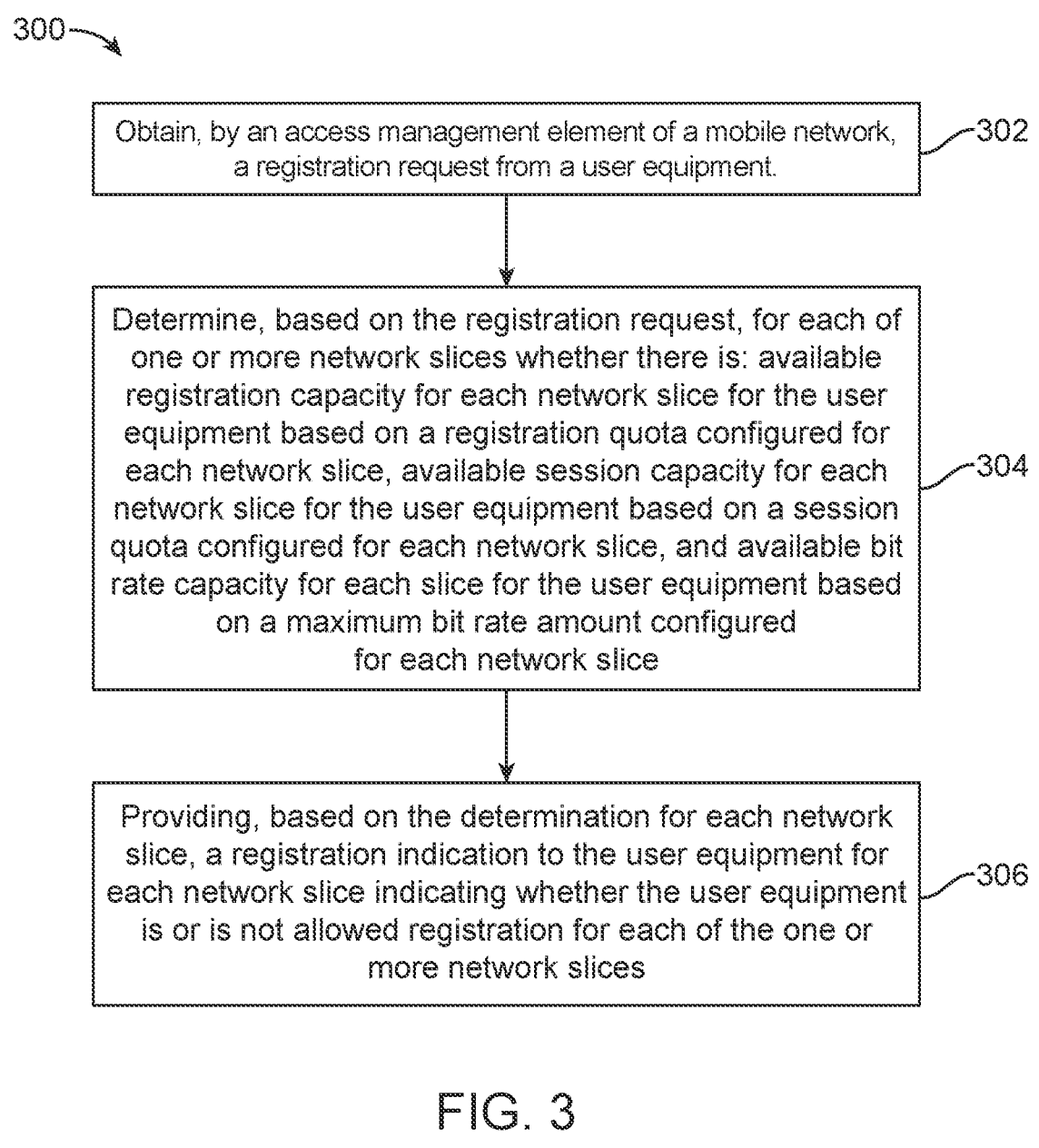

300 ⟍

┌─────────────────────────────────────────────────────┐
│ Obtain, by an access management element of a mobile network,  │ ⟋302
│     a registration request from a user equipment.             │
└─────────────────────────────────────────────────────┘
                          │
                          ▼
┌─────────────────────────────────────────────────────┐
│ Determine, based on the registration request, for each of     │
│ one or more network slices whether there is: available        │
│ registration capacity for each network slice for the user     │
│ equipment based on a registration quota configured for        │
│ each network slice, available session capacity for each       │ ⟋304
│ network slice for the user equipment based on a session       │
│ quota configured for each network slice, and available bit    │
│ rate capacity for each slice for the user equipment based     │
│ on a maximum bit rate amount configured                       │
│ for each network slice                                        │
└─────────────────────────────────────────────────────┘
                          │
                          ▼
┌─────────────────────────────────────────────────────┐
│ Providing, based on the determination for each network        │
│ slice, a registration indication to the user equipment for    │
│ each network slice indicating whether the user equipment      │ ⟋306
│ is or is not allowed registration for each of the one or      │
│ more network slices                                           │
└─────────────────────────────────────────────────────┘

FIG. 3

PROVIDING NETWORK SLICE ADMISSION CONTROL IN A MOBILE NETWORK ENVIRONMENT

TECHNICAL FIELD

The present disclosure relates to network equipment and services.

BACKGROUND

Networking architectures have grown increasingly complex in communications environments, particularly mobile networking environments. In particular, network slicing is a networking concept that has been introduced for Third Generation Partnership Project (3GPP) mobile networks, such as 3GPP Fifth Generation (5G) mobile networks. With the introduction of network slicing architectures, there are significant challenges in managing network communications and connectivity for mobile network devices.

BRIEF DESCRIPTION OF THE DRAWINGS

FIG. 3 is a flow chart depicting a method according to an example embodiment.

DESCRIPTION OF EXAMPLE EMBODIMENTS

Overview

Figure 1:
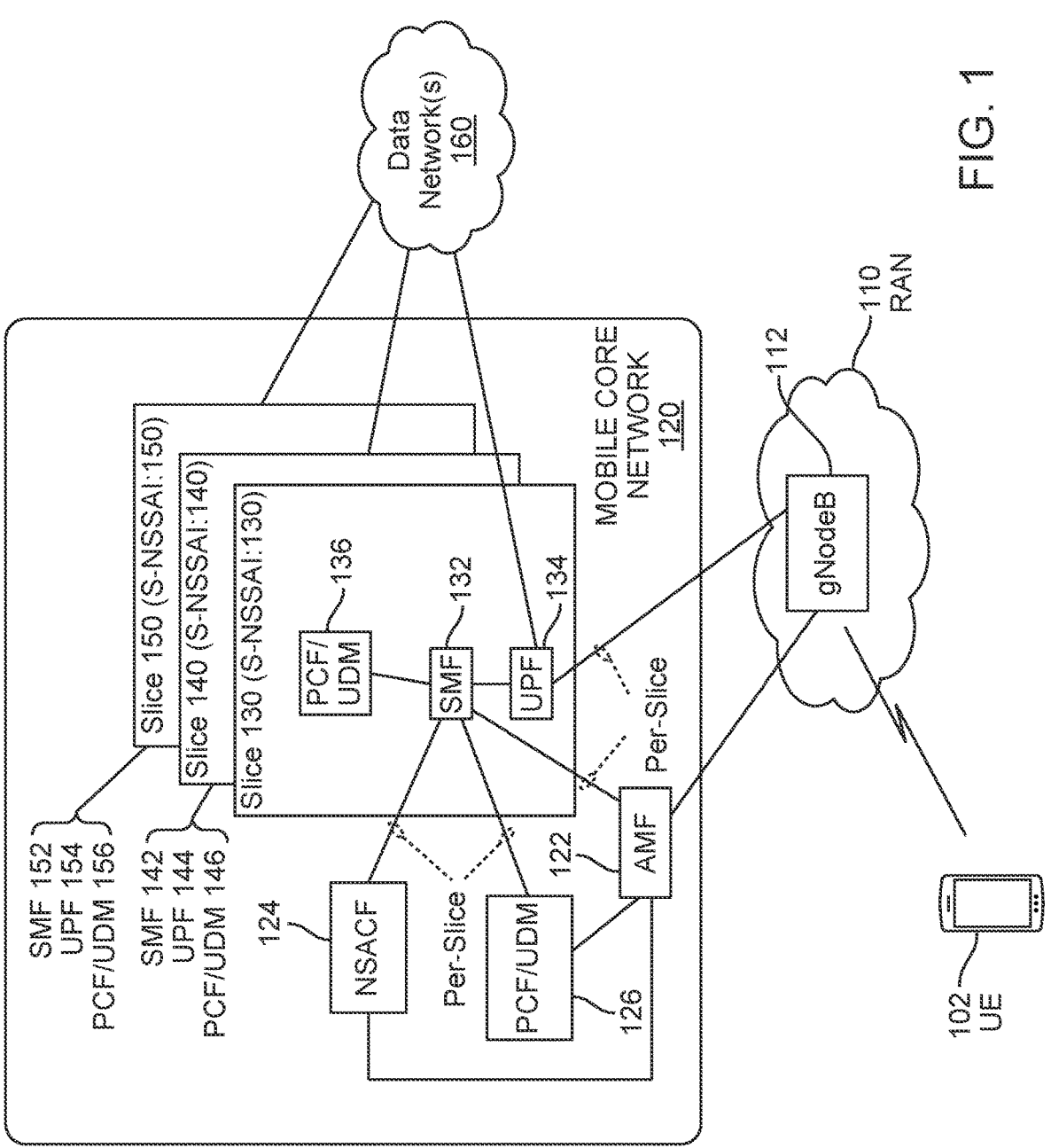
FIG. 1 is a block diagram of a system in which techniques may be implemented to provide network slice admission control in a mobile network environment, according to an example embodiment.

Presented herein are techniques to provide network slice admission control in a mobile network environment, which can improve user experience in mobile networks, such as in Third Generation Partnership Project (3GPP) Fifth Generation (5G) mobile networks, Sixth Generation (6G) mobile networks, or the like.

Currently, there is a gap in Third Generation Partnership Project (3GPP) standards involving network slice registration and session establishment for mobile network architectures. For example, in current network architectures, a user equipment (UE) may be allowed network slice service for a particular network slice at the time of registration; however, at a later time when the UE requests Protocol Data Unit (PDU) session creation for the particular network slice, the UE's service request may be rejected due to a session quota/capacity or a bit rate (i.e., throughput) quota/capacity being reached.

In accordance with embodiments herein, enhanced network slice admission control procedures are provided such that, upon obtaining a registration request from a particular UE, a determination can be made, per-network slice with which the UE seeks to register, as to whether there is available slice capacity, available session capacity, and available bit rate capacity for the UE for each network slice. If all three capacities are available at the time of registration for a particular network slice, then the UE will be allowed to receive service from the particular network slice.

In one embodiment, a method is provided that may include obtaining, by an access management element of a mobile network, a registration request from a user equipment; determining, based on the registration request, for each of one or more network slices whether there is: available registration capacity for each network slice for the user equipment based on a registration quota configured for each network slice, available session capacity for each network slice for the user equipment based on a session quota configured for each network slice, and available bit rate capacity for each slice for the user equipment based on a maximum bit rate amount configured for each network slice; and providing, based on the determining, a registration indication to the user equipment for each network slice indicating whether the user equipment is or is not allowed registration for each of the one or more network slices.

EXAMPLE EMBODIMENTS

Network slicing is a key concept in the Third Generation Partnership Project (3GPP) Fifth Generation (5G) System (5GS) architecture. A network slice is a logical end-to-end network that can be dynamically created and may include any combination of 3GPP mobile core network functions/ functionality. Generally, a network slice, also referred to generally as a 'slice', 'instantiated slice', or 'slice instance', can refer to a group or set of Virtualized Network Functions (VNFs) that are configured to facilitate a certain mobile network service or group of mobile network services.

A given UE may have access to multiple network slices over the same Radio Access Network (RAN). Each network slice may serve a particular service type with an agreed upon Service-level Agreement (SLA). To provide mobile network services associated with a given network slice type, a slice of the given slice type can be instantiated in which the instantiated slice for the slice type can provide certain mobile network services to a number of UEs.

A network slice instance within a Public Land Mobile Network (PLMN) can include any combination of Next Generation (NG) RAN and/or core network control plane and user plane network functions.

Per-3GPP Technical Specification (TS) 23.501, Section 5.15.2, Single-Network Slice Selection Assistance Information (S-NSSAI) can be used to uniquely identify a slice in which an S-NSSAI includes a Slice/Service Type (SST) indication, which indicates the expected slice behavior for a slice requested by a UE in terms of expected features and services, and, optionally, can include a Slice Differentiator (SD), which can be used to differentiate among multiple slices of a same SST.

Different types of slices (slice types) can be configured for a mobile network such that each slice type can provide certain mobile network services. As referred to herein and in the claims, the terms 'slice', 'slice instance' and/or variations thereof may be used interchangeably to refer to a type of slice that is instantiated (e.g., configured, created, validated, operated, managed, etc.) within a mobile core network to provide one or more mobile network services for one or more user equipment. Various VNFs that can be configured for a slice type in accordance with techniques described herein can include any combination of 3GPP Fourth Generation/Long Term Evolution (4G/LTE) VNFs, 5G VNFs, 6G VNFs, etc., as may be prescribed, at least in part, by 3GPP standards.

Various example slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

For various examples herein, a slice requested by a UE can be referenced generally as a number or value, formatted as "S-NSSAJ: #" in various examples herein, in which the number (#) can correspond to an SST value and, optionally, an SD, in accordance with 3GPP specifications. It is to be understood that any SST values may be configured by a mobile network operator for other slice types. Additionally, slice type values used for various examples/embodiments described herein may differ from standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

Release 17 (Rel-17 or R17) of 3GPP standards provide for the inclusion of a new network function (NF) in mobile core networks in which the new NF is referred to as a Network Slice Admission Control Function (NSACF) that has been added to 3GPP specifications as part of various enhancements to network slicing architectures. Generally, the NSACF operates to monitor and control/manage the number of registered UEs per network slice and/or to monitor and control/manage the number of Protocol Data Unit (PDU) sessions per network slice for network slices in a mobile core network deployment that are to be subject to Network Slice Admission Control (NSAC). The NSACF can be configured with per-network slice quota thresholds or limits regarding a maximum number of UEs that can be registered with a given network slice that is to be subject to NSAC validation and/or a maximum number of PDU sessions that are allowed to be served for a given network slice that is subject to NSAC validation.

Current 3GPP standards, such as 3GPP TS 23.501, Version 17.4.0, Section 5.15.10 and Section 5.15.11, published in March 2022, and 3GPP TS 23.502, Version 17.4.0, Sections 4.2.9 and 4.2.11, published March 2022, provides that when a UE seeks to register with a given network slice (a given S-NSSAI value, generally referred to herein as 'S-NSSAI'), the NSACF can perform an NSAC registration validation procedure to determine whether a slice registration quota threshold or limit (sometimes referred to as 'Reg-Quota threshold') for the given S-NSSAI has been satisfied/reached, and can reject the UE registration with the given network slice (S-NSSAI) if the slice registration quota threshold or limit has been satisfied/reached for the given network slice (S-NSSAI).

Per current 3GPP standards, when a UE seeks registration with a given network slice (S-NSSAI) and an NSAC registration validation for the given network slice is successful, a Network Slice Specific Authorization (NSSAA) procedure is performed via an exchange (e.g., an Extensible Authentication Protocol (EAP) exchange) between the UE, an Access and Mobility Management Function (AMF), an NSSAA Function (NSSAAF), and an Authentication, Authorization, and Accounting (AAA) function, in the mobile core network for the network slice with which the UE seeks registration, as prescribed at least by 3GPP TS 23.502, Section 4.2.9. Following a successful NSSAA exchange for the network slice with which the UE seeks registration, the UE is provided an indication regarding whether registration of the UE with the given network slice is allowed through use of an Allowed NSSAI indication provided to the UE via a UE configuration update procedure. The NSSAA procedure can be performed per-slice for multiple network slices with which the UE seeks registration.

At a later time, assuming that the UE is registered for a given network slice (S-NSSAI), when the UE requests PDU session establishment for the slice, the NSACF can perform an NSAC session validation procedure to determine whether a slice PDU session quota threshold or limit has been satisfied/reached for a given network slice (S-NSSAI), and can reject the UE's PDU session establishment request for the given network slice (S-NSSAI) if the slice PDU session quota threshold or limit (sometimes referred to as a 'NSAC PDU Count Threshold') has been satisfied/reached for the given network slice (S-NSSAI).

Additionally, for 3GPP Release 17 standards, a slice maximum data rate (also referred to as 'bit rate') threshold or limit can be configured for an S-NSSAI (which indicates that the network slice is subject to network slice data rate limitation control) by a network operator (e.g., based on an SLA related to the network slice). During operation, a Policy Control Function (PCF) in the mobile core network can monitor the data rate of a given network slice (S-NSSAI) that is subject to network slice data rate limitation control and can ensure that the data rate for the given network slice (S-NSSAI) does not exceed the maximum slice data rate configured for the given network slice by, for example, rejecting new session management (SM) policy associations for a given UE.

Thus, even if a UE PDU session for a given network slice is possible because the network slice has PDU session capacity, there is a possibility of rejection of a PDU session request for the UE due to the slice data rate threshold for the given network slice being reached.

Consider a scenario in which a given UE has been allowed access to a given network slice (S-NSSAI) during registration, following a successful NSAC registration validation and NSSAA validation for the UE with the given network slice. At a later time, when the UE seeks to establish a PDU session for the given network slice, the PDU session request can be rejected due though an NSAC session validation procedure due to the slice PDU session quota threshold or limit being reached. This means that, even though the UE was allowed registration with a particular network slice (S-NSSAI) (following NSAC registration validation and NSSAA validation with the particular network slice), the UE may still not be allowed to use the service provided by the particular network slice (S-NSSAI) due to failing the NSAC session validation, which is contradicting in nature and can also negatively impact UE/user experience.

Thus, issues are caused due to various threshold validations being performed at different events during network connectivity such as, for example, checking the network slice registration quota threshold during the UE registration procedure, checking the network slice PDU session quota threshold during the PDU session establishment procedure, and then checking the slice maximum bit rate (MBR) threshold during SM policy establishment.

In order to address issues as discussed above, techniques are described herein that can be utilized within a mobile core network environment in order to enhance current NSAC validation procedures such that all quota threshold/level determinations for one or more network slices (registration quota validation, session quota validation, and maximum data rate validation, as applicable) can be performed at the time that a UE seeks registration with one or more network slices (S-NSSAI(s)).

Referring to FIG. 1, FIG. 1 is a block diagram of a system 100 in which techniques may be implemented to provide network slice admission control in a mobile network environment, according to an example embodiment. As shown in FIG. 1, system 100 may include a UE 102, a Radio Access Network (RAN) 110, a mobile core network 120, and one or more data networks 160. RAN 110 may be implemented as a 3GPP 5G/next generation (nG) RAN and may include at least one gNodeB 112 (sometimes referred to as a 'gNB').

In at least one embodiment, mobile core network 120 may be representative of a 5G core (5GC) network or 5GS and may include an Access and Mobility Management Function (AMF) 122, Network Slice Admission Control Function (NSACF) 124, and a Policy Control Function (PCF) and Unified Data Management (UDM) entity 126. PCF/UDM 126 may interface with or include a Unified Data Repository (UDR), not shown in FIG. 1. PCF/UDM 126 are illustrated as a combined element in FIG. 1, however, it is to be understood that a PCF and a UDM may be implemented as separate network elements. Further, although illustrated as a standalone network element for the embodiment of FIG. 1, it is to be understood that NSACF 124 may be implemented as part of functionality provided for AMF 122 or PCF/UDM 126 in various embodiments.

Mobile core network 120 may also include a number of network slices that have been instantiated for corresponding slice types provided by mobile core network 120 for various services (e.g., general services, mIoT services, URLLC services, etc.) that may be provided for one or more PDU sessions for UE 102 (or any other UE that may be present in mobile core network 120). For example, mobile core network 120 may include a network slice 130, a network slice 140, and a network slice 150 in which each slice may be configured to provide services for each of a corresponding slice type and may be identified by a corresponding S-NS-SAI. Each network slice may include a corresponding Session Management Function (SMF), a corresponding User Plane Function (UPF), and a corresponding PCF/UDM.

In at least one embodiment, network slice 130 may include an SMF 132, a UPF 134, and a PCF/UDM 136 and may be referred to interchangeably herein as 'S-NSSAI: 130'. Also shown in FIG. 1, in at least one embodiment, network slice 140 may include an SMF 142, a UPF 144, and a PCF/UDM 146 and may be referred to interchangeably herein as 'S-NSSAI: 140'. Further, in at least one embodiment, network slice 150 may include an SMF 152, a UPF 154, and a PCF/UDM 156 and may be referred to interchangeably herein as 'S-NSSAI: 150'. The SMFs, UPFs, and PCFs/UDMs for each of network slices 140 and 150 are labeled but not shown in FIG. 1 for purposes of brevity only in order to illustrate/discuss other features of system 100.

The VNFs (e.g., SMF 132, 142, and 152; UPF 134, 144, and 154; PCF/UDM 136, 146, and 156) for the network slices of mobile core network 120 are shown for illustrative purposes only and are not meant to limit the broad scope of the present disclosure. It is to be understood that any VNFs may be provided for network slices (slice instances) as may be prescribed by 3GPP standards, GSMA standards, etc. for various mobile network services that may be provided by various slice types. Further, in some instances multiple SMFs and/or UPFs may be provided for one or more of network slices 130, 140, and/or 150.

Further, it is to be understood that other VNFs/network elements may be configured for mobile core network 120 for any combination of Third Generation (3G)/Fourth Generation (4G)/5G/6G/nG implementations, such as any combination of a Policy and Charging Rules Function (PCRF), a Network Repository Function (NRF) (sometimes referred to as a NF Repository Function), a Network Slice Selection Function (NSSF), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In various embodiments, the data networks 160 of FIG. 1 may include be any combination of the Internet, a gaming network, an Internet Protocol (IP) Multimedia Subsystem (IMS), an Ethernet data network (not shown), Ethernet switching system(s) (not shown), and/or the like.

RAN 110, via gNodeB 112, may interface with mobile core network 120 via one or more wired and/or wireless interfaces. For example, gNodeB 112 may interface with AMF 122. The gNodeB 112 may also interface with each of UPF 134 of network slice 130, UPF 144 of network slice 140, and UPF 154 network slice 150. RAN 110, via gNodeB 112, may also interface with UE 102 via one or more over-the-air Radio Frequency (RF) connections.

Regarding mobile core network 120, AMF 122 may further interface with NSACF 124 and PCF/UDM 126. AMF 122 may also interface with each of SMF 132 of network slice 130, SMF 142 of network slice 140, and SMF 152 of network slice 150. PCF/UDM 126 may also interface with each of SMF 132 of network slice 130, SMF 142 of network slice 140, and SMF 152 of network slice 150. SMF 132 and UPF 134 of network slice 130 may further interface with each other, and SMF 132 may also interface with PCF/UDM 136. Although not shown in FIG. 1, SMF 142 and UPF 144 of network slice 140 may further interface with each other, and SMF 142 may also interface with PCF/UDM 146 in a manner similar to that as shown for network slice 140. Additionally, SMF 152 and UPF 154 of network slice 150 may further interface with each other, and SMF 152 may also interface with PCF/UDM 156 in a similar manner. Additionally, UPF 134 of network slice 130 may further interface with data network(s) 160, UPF 144 of network slice 140 may also interface with data network(s) 160, and UPF 154 of network slice 150 may also interface with data network(s) 160.

The various interfaces shown in FIG. 1 are provided for illustrative purposes only and are not meant to limit the broad scope of the present disclosure. It is to be understood that network connectivity/interfaces among any of UE 102, RAN 110, mobile core network 120 and data network(s) 160, and any elements/logic associated therewith, may be provided in any manner/configuration in accordance with 3GPP standards to facilitate operations as discussed for embodiments herein.

Generally, RAN 110 may include any combination of one or more 3GPP 5G/nG gNodeB or gNB, such as gNodeB 112 and/or 3GPP 4G/LTE evolved node Bs (eNodeBs or eNBs), not shown, to facilitate network connectivity between UE 102 and mobile core network 120. A gNodeB/eNodeB, such as gNodeB 112, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for RAN 110 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more UE, such as UE 102, may utilize to connect to RAN 110 for one or more sessions (e.g., voice, video, data, gaming, combinations thereof, etc.) with a mobile core network, such as mobile core network 120.

A UE, such as UE 102, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. Thus, a UE may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, such as RAN 110, for one or more sessions with a mobile core network, such as mobile core network 120.

In addition to various operations discussed for techniques herein, an AMF, such as of AMF 122, may facilitate access and mobility management control/services for one or more UE, such as UE 102, for connection of UE 102 with one or more of network slice(s) 130, 140, and/or 150 of mobile core network 120. In addition to various operations discussed for techniques herein, an SMF, such as SMF 132 for network slice 130 (and any other SMFs discussed herein) may be responsible for UE PDU session management (SM), with individual functions/services being supported on a per-session basis in order to facilitate data transfer(s) between a UE and one or more data network(s) 160 via one or more UPFs. Generally, a UPF, such as UPF 134 of network slice 130 (and any other UPFs discussed herein) may operate to provide packet routing and forwarding operations for user data traffic and may also perform a variety of functions such as packet inspection, traffic optimization, QoS, policy enforcement and user data traffic handling (e.g., to/from one or more data network(s) 160), and billing operations (e.g., accounting, etc.) for UE 102 PDU sessions.

Typically, a PCF, such as the PCF of PCF/UDM 126 (or any other PCF/UDM discussed herein) stores policy data for the mobile core network 120 to provide policy control services (e.g., to facilitate access control for UE 102, network selection, etc.). Typically, a UDM, such as the UDM of PCF/UDM 126 (or any other PCF/UDM discussed herein) stores subscription data for subscribers (e.g., a user associated with UE 102) that can be retrieved and/or otherwise obtained/utilized during operation of system 100. In accordance with embodiments herein, PCF/UDM 126 may also track/manage a remaining data or bit rate (i.e., maximum bit rate (MBR)) remaining or available per-network slice based on a maximum data rate threshold for each network slice (e.g., 100000 kilobits per second (kbps) for a given slice, shared among all users of the slice based on their session bit rate requirements).

NSACF 124 operates to monitor and control/manage the number of registered UEs per network slice 130, 140, and 150 and to monitor and control/manage the number of PDU sessions per network slice for network slices 130, 140, and 150, which are considered to be subject to NSAC validation procedures discussed for embodiments herein. The NSACF 124 can be configured with per-network slice quota thresholds or limits regarding a maximum number of UEs that can be registered with each of network slice 130, 140, and 150 and can also be configured with a maximum number of PDU sessions that are allowed to be served for each network slice 130, 140, and 150. During operation, NSACF 124 can maintain a count of registrations and PDU sessions for each network slice 130, 140, and 150, in relation to the maximum threshold quotas (registration and session) in order to perform NSAC validations in accordance with techniques discussed herein.

During operation of system 100, various improvements may be provided over existing NSAC procedures, which may facilitate improved user experience within slicing-based mobile network implementations.

For example, to eliminate the contradicting behavior of the network in current implementations in which a UE is allowed to register for a slice but may (later) not be allowed to access the service offered by the slice, techniques herein provide that when a UE, such as UE 102, seeks registration with one or more network slice(s) (S-NSSAI(s), the AMF 122 will trigger the NSACF 124 to perform per-network slice NSAC registration validation operations (i.e., to check the slice Reg-Quota threshold for each slice) to determine whether there is registration quota left for the UE to register with each slice, and will also trigger the NSACF 124 to perform per-network slice NSAC session validation operations (e.g., to check the slice PDU session quota threshold for each slice) to determine whether there is PDU session quota available for the UE 102 to establish a session with each slice. Further, the AMF 122 will trigger the PCF/UDM 126 to perform per-network slice data rate validations to determine whether there is enough data rate capacity with regard the to the data rate limit set for each network slice.

If there is any of: 1) no registration quota available for a given network slice, 2) no PDU session quota available for a given network slice, or 3) no data rate capacity for a given network slice, the UE 102 will not be allowed to register with the given network slice in accordance with embodiments herein. Thus, embodiments herein may enable the UE 102 to select different slice(s) for registration (potentially from different networks) before the UE 102 triggers establishment of one or more PDU session(s).

Various enhancements to the above operations may also be provided in some embodiments, which may help to reduce the rejection of service due to quota issues. For example, in some instances, a new flag may be provided in a subscription profile/information for a given subscriber/UE within PCF/UDM 126 to indicate that a subscriber is a 'premium subscriber' for certain allowed network slices. In at least one embodiment, such subscribers can be allowed specific slice services, even in cases involving overload conditions.

For example, in some embodiments, the NSACF 124 could maintain some reserved quota for premium subscribers (e.g., X % of the total quota, based on operator configuration) for registration quota and/or PDU session quota, could be reserved for premium subscribers in order to allow such premium subscribers to be ensured registration to certain network slice(s), even in cases involving overload situations. In such embodiments, the NSACF 124 may begin notifying the AMF 122 before a particular quota threshold is reached or met, keeping the reserved quota (e.g., X %) for premium subscribers (e.g., notification quota threshold=total quota threshold−(X %*total quota threshold)).

Consider various operational details for providing network slice admission control in a mobile network environment in at least one embodiment, with further reference to FIG. 2, discussed below. For example, FIG. 2 a message sequence diagram illustrating a call flow 200 associated with providing network slice admission control in a mobile network environment, according to an example embodiment.

Figure 2:
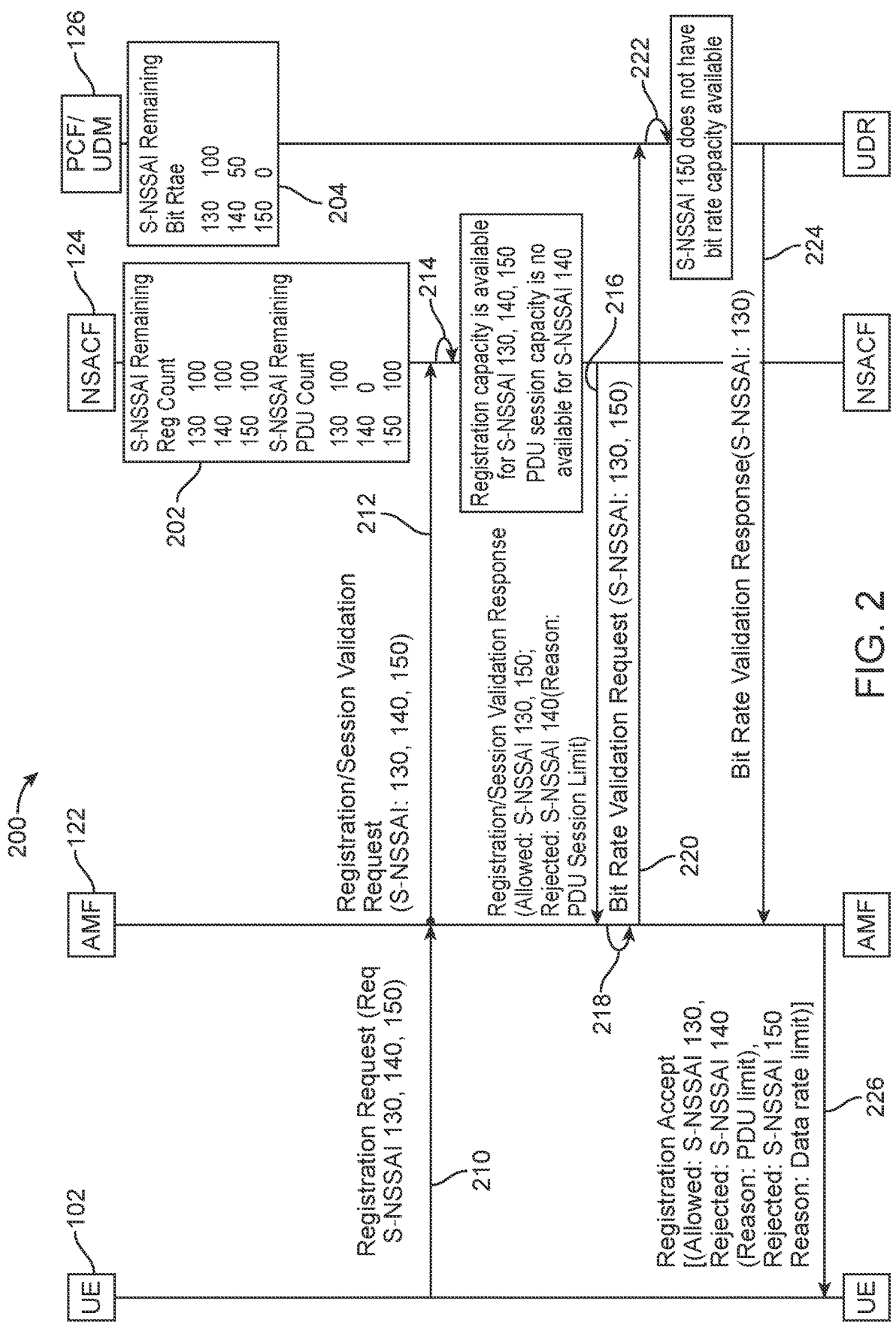
FIG. 2 is a message sequence diagram illustrating a call flow associated with providing network slice admission control in a mobile network environment, according to an example embodiment.

Consider for the example operational flows that FIG. 2 include UE 102, AMF 122, NSACF 124 and PCF/UDM 126. Although not shown in FIG. 2, it is assumed that UE 102 interacts/communicates with various network elements of mobile core network 120 via RAN 110/gNodeB 112, as shown in FIG. 1.

As shown at 202, consider that NSACF 124 controls/manages/monitors a per-network slice count of the number of UEs registered to each network slice (S-NSSAI) 130, 140, and 150 and also a per-network slice count of the number of PDU sessions for each network slice (S-NSSAI) 130, 140, and 150. For example, consider that each network slice 130, 140, and 150 are configured with a maximum quota threshold number of UEs that can be registered to each network slice, such that the maximum quota threshold number of UEs that can be registered for each network slice is 125 UEs and, as each of a number of UEs is registered with each slice, the NSACF 124 subtracts '1' from the maximum quota threshold number to determine the number of remaining registrations that can be supported for each network slice (or other similar counting mechanism/scheme). Thus, for the embodiment of FIG. 2, consider that the number of remaining registrations that can be supported for each network slice includes 100 registrations remaining for network slice 130, 100 registrations remaining for network slice 140, and 100 registrations remaining for network slice 150.

Further, consider that each network slice 130, 140, and 150 are configured with a maximum quota threshold number of PDU sessions that can be established for each network slice, such that the maximum quota threshold number of PDU sessions that can be established for each network slice is 125 UEs and, as each of a number of UE PDU sessions is established with each slice, the NSACF 124 subtracts '1' from the maximum quota threshold number to determine the number of remaining PDU UE sessions that can be established for each network slice (or other similar counting mechanism/scheme). Thus, for the embodiment of FIG. 2, consider that the number of remaining PDU sessions that can be established each network slice includes 100 PDU sessions remaining for network slice 130, zero (0) PDU sessions remaining for network slice 140, and 100 PDU sessions remaining for network slice 150.

Also shown in FIG. 2 at 204, consider that PCF/UDM 126 controls/manages/monitors a per-network slice count of the bit rate remaining for each network slice (S-NSSAI) 130, 140, and 150. For example, consider that each network slice 130, 140, and 150 are configured with a maximum bit rate can supported by each network slice, such that the maximum bit rate that can be supported by each network slice is 150 kbps, as each of a number of UEs is registered with each network slice, the PCF/UDM 126 subtracts a bit rate amount from the maximum bit rate to determine an amount of remaining bit rate that can be provided by each network slice (or other similar counting mechanism/scheme). In one example, the amount of bit rate subtracted from each network slice quota can be determined based on a guaranteed bit rate (GBR), MBR, default bearer bit rate, or other bit rate information that may be configured as subscriber information maintained by the PCF/UDM (and UDR) 126 for a number of subscribers. Thus, for the embodiment of FIG. 2, consider that the amount of remaining for each network slice is 100 (kbps) bit rate remaining for network slice 130, 50 (kbps) bit rate remaining for network slice 140, and zero (0) bit rate remaining for network slice 150.

For the example of FIG. 2, consider at 210 that UE 102 seeks to register with each network slice 130, 140, and 150 by sending a registration request to AMF 122 (via RAN/gNodeB 110/112) that identifies each network slice/S-NSSAI, which triggers AMF 122, in accordance with embodiments herein, to initiate a per-network registration and session validation with NSACF 124 for each network slice with which UE 102 seeks to register. For example, as shown at 212, AMF 122 sends a registration/session validation request to NSACF 124 identifying each network slice/S-NSSAI with which UE 102 seeks registration. In at least one embodiment, the message sent by AMF 122 at 212 may be a 3GPP 'Nnsacf_NSAC_Request' message including the identified network slice(s)/S-NSSAI(s) with which UE 102 seeks registration.

At 214, obtaining the registration/session validation request from AMF 122 by NSACF 124 triggers NSACF 124, as shown at 214, to perform a per-network slice check on the remaining registration (reg) count and the remaining PDU session count for each of network slice 130, 140, and 150, from which NSACF 124 determines that there is registration capacity available for each of network slice 130, 140, and 150, and that there is PDU session capacity available for each of network slice 130 and network slice 150, but there no PDU session capacity available for network slice 140 (PDU session count remaining=0).

Thus, at 216, NSACF 124 responds to the registration/session validation request from AMF 122 with a registration/session validation response that is sent to AMF 122, which identifies the network slice(s) with which UE 102 is allowed to seek registration (based on the NSAC registration/session validation determinations) and identifies the network slice(s) with which UE 102 is not allowed to seek registration (based on the NSAC registration/session validation determinations). For each network slice(s) with which UE 102 is not allowed to seek registration, NSACF 124 can identify a reason that registration with each network slice(s) is/are rejected (based on the NSAC registration/session validation (s) that failed). In at least one embodiment, the message sent by NSACF 124 at 216 may be a 3GPP 'Nnsacf_NSAC_Response' message including the various per-slice response information.

For the example shown in FIG. 2, consider that NSACF 124 sends a response to AMF 122 identifying that registration is allowed (based on the NSAC validation determinations) with respect to network slices 130 and 150, but that registration is not allowed (based on the NSAC validation determinations) with respect to network slice 140 with a reason indicator indicating that the PDU session limit has been reached for network slice 140 (e.g., Reason: "PDU Session Limit").

As shown at 218, receiving the response from NSACF 124 triggers AMF 122 to initiate a per-network slice NSAC bit rate validation with PCF/UDM 126 for each network slice with which UE 102 is allowed to seek registration, based on the result of NSAC registration/session validations. Thus, for the present example, AMF 122 sends a NSAC bit rate validation request to PCF/UDM 126, as shown at 220), that identifies network slices 130 and 150 with which UE 102 seeks registration for NSAC bit rate validation. As network slice 140 failed the NSAC registration/session validation procedure, discussed above for the present example, network slice 140 is not identified in the NSAC bit rate validation request. In at least one embodiment, the message sent by AMF 122 at 220 may be a 3GPP 'NUdr-NSAC-Request' message identifying the corresponding network slice(s)/S-NSSAI(s) with which registration is sought by UE 102.

As shown at 222, obtaining the request from AMF 122 by PCF/UDM 126 triggers the PCF/UDM 126 to determine whether there is bit rate remaining for network slices 130 and 150 based on the current remaining bit rate values maintained by PCF/UDM 126. For the present example, consider that PCF/UDM 126 determines that network slice 150 does not have remaining bit rate that can be provided for a PDU session involving UE 102. Thus, at 224, PCF/UDM 126 responds to the request from AMF 122 by sending an NSAC bit rate validation response to AMF 122 that only identifies that there is bit rate remaining for network slice 130. In at least one embodiment, the message sent by PCF/UDM 126 at 224 may be a 3GPP 'NUdr-NSAC-Response' message identifying the corresponding network slice(s)/S-NSSAI(s) with which registration is allowed.

Upon obtaining the response, AMF 122 can provide a registration response to UE 102 that identifies the network slice(s) with which the UE 102 is allowed to seek registration and identifies the network slice(s) with which UE 102 is not allowed to seek registration, with a reason indicator provided for each corresponding network slice with which registration is not allowed. For example, as shown at 226, consider that AMF 122 sends a registration accept message to UE 102 that identifies that registration is allowed for network slice 130 due to the network slice 130 having registration capacity available, PDU session capacity available, and bit rate capacity available for UE 102. The registration accept message sent to the UE 102 at 226 also identifies that registration is not allowed for network slice 140, along with a reason indicator indicating that the PDU session limit is reached for network slice 140, and that registration is also not allowed for network slice 150, along with a reason indicator indicating that the data rate limit has been reached for network slice 150. Thus, a registration indication for each network slice of one or more network slices with which the UE seeks registration is provided is provided to the UE via a single registration accept message, which, for those network slice(s) with which the UE is not allowed to register, reason indicator(s) can be provided within the registration accept message indicating reason(s) that registration with given network slice(s) is not allowed. In various embodiments, a reason indicator can indicate any combination of: that a registration limit or quota for the particular network slice is reached (as a reason as to why registration is not allowed/rejected for the particular network slice); that there is a session limit or quota for the particular network slice is reached (as a reason as to why registration is not allowed/rejected for the particular network slice); and/or that there a bit rate limit or quota for the particular network slice is reached (as a reason as to why registration is not allowed/rejected for the particular network slice).

Upon obtaining the registration accept message indicating that registration is allowed for network slice 130, then, although not shown in FIG. 2, UE 102 can then proceed to perform an NSSAA procedure and PDU session establishment with network slice 130, per 3GPP standards 23.502, etc.

For each network slice(s) with which UE 102 successfully registers and establishes a PDU session (e.g., network slice 130, in this example), NSACF 124 can update the number of remaining registrations that can be supported for each network slice and can update the number of PDU UE sessions remaining that can be established for each network slice accordingly (e.g., subtracted '1' from each count). Further, PCF/UDM 126 can update the remaining bit rate remaining for each network slice(s) with which UE successfully registers and establishes a PDU session.

It is to be understood that the order of NSAC validations discussed for the embodiment of FIG. 2 is provided for illustrative purposes only and can be performed in any order, upon receiving a registration request from a UE, in accordance with embodiments herein. Further, although the embodiment of FIG. 2 illustrates example details in which AMF 122 limits the network slice(s) for which NSAC bit rate validation is performed based on the result of the NSAC registration/session validations, it is to be understood that the NSAC registration/session validations with NSACF 124 and the NSAC bit rate validations with PCF/UDM 126 could be performed at the same time/in parallel, by AMF 122 and, upon obtaining results from both NSACF 124 and PCF/UDM 126, could then send a registration response to UE 102 including the appropriate allowed/rejected/reason information based on the outcome of the validations.

Accordingly, techniques herein facilitate improvements in 5G network slice admission control, which may improve user experience.

Referring to FIG. 3, FIG. 3 is a flow chart depicting a method 300 according to an example embodiment. In at least one embodiment, method 300 illustrates example operations that may be performed by an AMF, such as AMF 122, in order to provide network slice admission control, according to an example embodiment.

At 302, the method may include obtaining, by an access management element of a mobile network, a registration request from a user equipment. At 304, the method may include determining, based on the registration request, for each of one or more network slices whether there is: available registration capacity for each network slice for the user equipment based on a registration quota configured for each network slice, available session capacity for each network slice for the user equipment based on a session quota configured for each network slice, and available bit rate capacity for each slice for the user equipment based on a maximum bit rate amount configured for each network slice. At 306, the method may include providing, based on the determination for each network slice, a registration indication to the user equipment for each network slice indicating whether the user equipment is or is not allowed registration for each of the one or more network slices.

Accordingly, utilizing techniques provided herein facilitate improvements in 5G network slice admission control, which may improve user experience.

Figure 4:
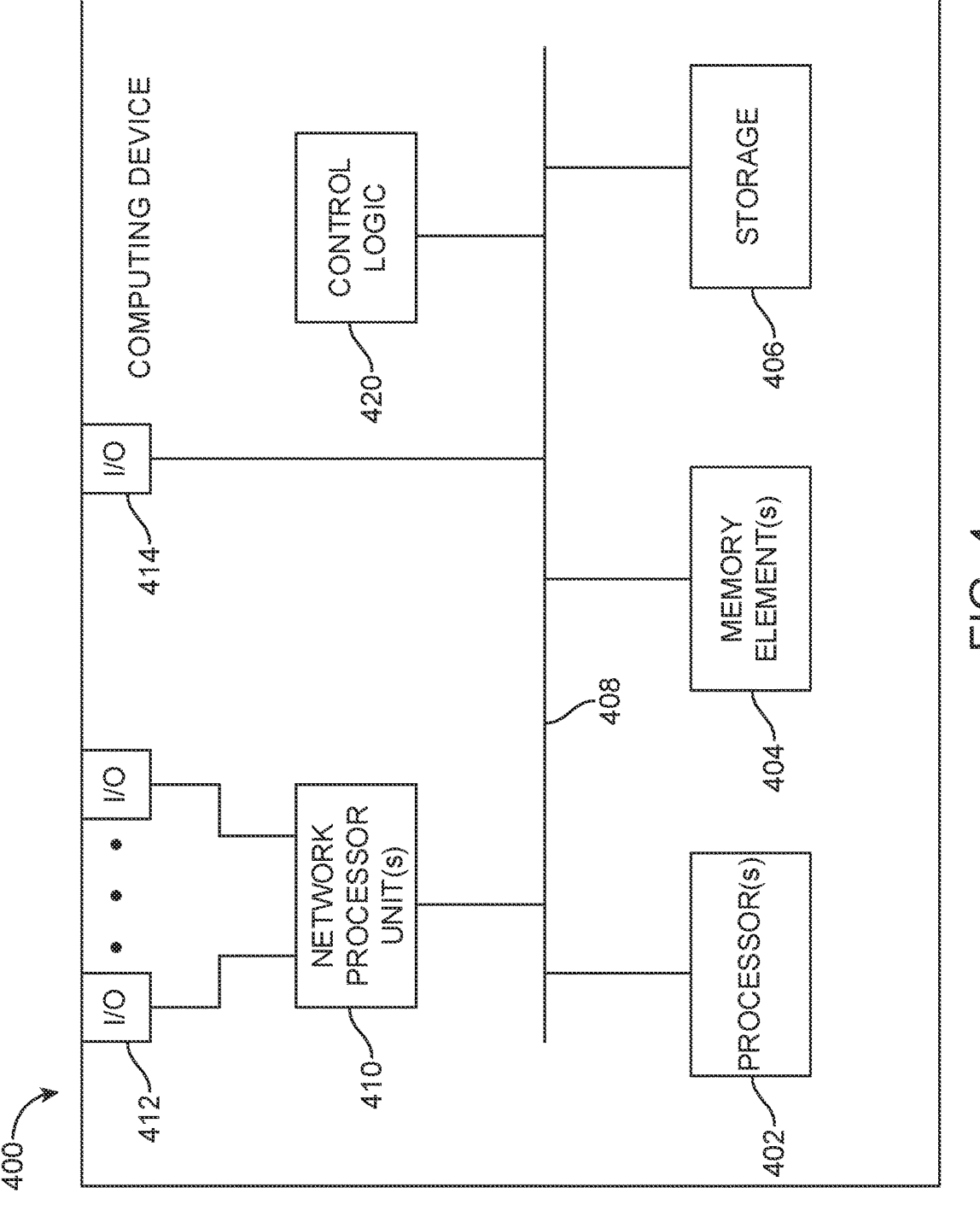
FIG. 4 is a hardware block diagram of a computing device that may perform functions associated with any combination of operations, in connection with the techniques discussed herein.

Referring to FIG. 4, FIG. 4 illustrates a hardware block diagram of a computing device 400 that may perform functions associated with operations discussed herein. In various embodiments, a computing device or apparatus, such as computing device 400 or any combination of computing devices 400, may be configured as any entity/entities as discussed herein in order to perform operations of the various techniques discussed herein, such as, for example, any of AMF 122, NSACF 124, PCF/UDM 126, and/or any other network element discussed for embodiments herein.

In at least one embodiment, computing device 400 may be any apparatus that may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., hardware processor(s)) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communications (wired and/or wireless) between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) and/or antennas/antenna arrays now known or hereafter developed. Thus, the network processor unit(s) 410 and/or network I/O interface(s) 412 may include suitable interfaces for receiving, transmitting, and/or otherwise communicating (in a wired and/or wireless manner) data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

For example, in at least one embodiment in which computing device is implemented as at least an AMF, such as AMF 122, the control logic 420 can include instructions that, when executed, cause processor(s) 402 to perform functions including obtaining a registration request from a user equipment; determining, based on the registration request, for each of one or more network slices whether there is: available registration capacity for each network slice for the user equipment based on a registration quota configured for each network slice, available session capacity for each network slice for the user equipment based on a session quota configured for each network slice, and available bit rate capacity for each slice for the user equipment based on a maximum bit rate amount configured for each network slice; and providing, based on the determining, a registration indication to the user equipment for each network slice indicating whether the user equipment is or is not allowed registration for each of the one or more network slices.

The programs described herein (e.g., control logic 420 of computing device 400) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of (one or more) non-transitory tangible media and/or (one or more) non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 404 of computing device 400) and/or storage (e.g., storage 406 of computing device 400) can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by an access management element of a mobile network, a registration request from a user equipment; determining, based on the registration request, for each of one or more network slices whether there is:

available registration capacity for each network slice for the user equipment based on a registration quota configured for each network slice, available session capacity for each network slice for the user equipment based on a session quota configured for each network slice, and available bit rate capacity for each slice for the user equipment based on a maximum bit rate amount configured for each network slice; and providing, based on the determining, a registration indication to the user equipment for each network slice indicating whether the user equipment is or is not allowed registration for each of the one or more network slices.

The user equipment is allowed registration with a particular network slice of the one or more network slices based on there being all of available registration capacity, available session capacity, and available bit rate capacity for the particular network slice for the user equipment. In one instance, the registration indication for each network slice of the one or more network slices is provided via a single registration accept message sent to the user equipment.

In one instance, if the user equipment is not allowed registration with a particular network slice, the user equipment is provided a reason indicator indicating a reason that the user equipment is not allowed registration with the particular network slice. In one instance, the reason indicator indicates at least one of: that a registration limit for the particular network slice is reached; that there is a session limit for the particular network slice is reached; or that there a bit rate limit for the particular network slice is reached.

In one instance, for at least one network slice of the one or more network slices at least one of: a registration capacity for the at least one network slice includes a reserved quota for a particular group of subscribers; a session capacity for the at least one network slice includes a reserved quota for a particular group of subscribers; or a bit rate capacity for the at least one network slice includes a reserved quota for a particular group of subscribers.

In one instance, the method may further include obtaining by the access management element and indication of at least one of: the reserved quota for the particular group of subscribers has been met for the registration capacity for the at least one network slice; the reserved quota for the particular group of subscribers has been met for the session capacity for the at least one network slice; or the reserved quota for the particular group of subscribers has been met for the bit rate capacity for the at least one network slice. In one instance, the access management element is an Access and Mobility Management Function (AMF).

In one form, a computer-implemented method is provided that may include obtaining, by an access management element of a mobile network, a registration request from a user equipment; obtaining, based on the registration request, an indication for each of one or more network slices whether there is: available registration capacity for each network slice for the user equipment based on a registration quota configured for each network slice, available session capacity for each network slice for the user equipment based on a session quota configured for each network slice, and available bit rate capacity for each slice for the user equipment based on a maximum bit rate amount configured for each network slice; and providing a registration indication to the user equipment for each network slice indicating whether the user equipment is or is not allowed registration for each of the one or more network slices. In one instance, an indication of whether there is available registration capacity for each network slice for the user equipment based on the registration quota configured for each network slice and an indication of whether there is available session capacity for each network slice for the user equipment based on the session quota configured for each network slice is obtained by the access management element from a Network Slice Admission Control Function (NSACF). In one instance, an indication of whether there is available bit rate capacity for each slice for the user equipment based on a maximum bit rate amount configured for each network slice is obtained by the access management element from any of a Policy Control Function (PCF), a Unified Data Management (UDM) entity, or a Unified Data Repository (UDR).

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by an access management element of a mobile network, a registration request from a user equipment, wherein the registration request is obtained from the user equipment before the user equipment seeks session establishment with the mobile network;
for the registration request that is obtained from the user equipment before user equipment seeks session establishment with the mobile network, determining for each of one or more network slices whether there is each of:
available registration capacity for each network slice for the user equipment based on a registration quota configured for each network slice,
available session capacity for each network slice for the user equipment based on a session quota configured for each network slice, and
available bit rate capacity for each slice for the user equipment based on a maximum bit rate amount configured for each network slice; and
providing, based on the determining, a registration indication to the user equipment for each network slice indicating whether the user equipment is or is not allowed registration for each of the one or more network slices, wherein the user equipment is to seek session establishment for at least one network slice upon obtaining the registration indication indicating that the user equipment is allowed registration for at least one network slice of the one or more network slices.

2. The method of claim 1, wherein the user equipment is allowed registration with a particular network slice of the one or more network slices based on determining that there is each of available registration capacity, available session capacity, and available bit rate capacity for the particular network slice for the user equipment.

3. The method of claim 1, wherein the registration indication for each network slice of the one or more network slices is provided via a single registration accept message sent to the user equipment.

4. The method of claim 1, wherein if the user equipment is not allowed registration with a particular network slice, the user equipment is provided a reason indicator indicating a reason that the user equipment is not allowed registration with the particular network slice.

5. The method of claim 4, wherein the reason indicator indicates at least one of:
that a registration limit for the particular network slice is reached;
that there is a session limit for the particular network slice is reached; or
that there a bit rate limit for the particular network slice is reached.

6. The method of claim 1, wherein for at least one network slice of the one or more network slices at least one of:
a registration capacity for the at least one network slice includes a reserved quota for a particular group of subscribers;
a session capacity for the at least one network slice includes a reserved quota for a particular group of subscribers; or
a bit rate capacity for the at least one network slice includes a reserved quota for a particular group of subscribers.

7. The method of claim 6, further comprising:
obtaining by the access management element and indication of at least one of:
the reserved quota for the particular group of subscribers has been met for the registration capacity for the at least one network slice;
the reserved quota for the particular group of subscribers has been met for the session capacity for the at least one network slice; or
the reserved quota for the particular group of subscribers has been met for the bit rate capacity for the at least one network slice.

8. The method of claim 1, wherein the access management element is an Access and Mobility Management Function (AMF).

9. One or more non-transitory computer readable storage media encoded with instructions that, when executed by a processor, cause the processor to perform operations, comprising:
obtaining, by an access management element of a mobile network, a registration request from a user equipment, wherein the registration request is obtained from the user equipment before the user equipment seeks session establishment with the mobile network;
for the registration request that is obtained from the user equipment before user equipment seeks session establishment with the mobile network, determining for each of one or more network slices whether there is each of:
available registration capacity for each network slice for the user equipment based on a registration quota configured for each network slice,
available session capacity for each network slice for the user equipment based on a session quota configured for each network slice, and available bit rate capacity for each slice for the user equipment based on a maximum bit rate amount configured for each network slice; and providing, based on the determining, a registration indication to the user equipment for each network slice indicating whether the user equipment is or is not allowed registration for each of the one or more network slices, wherein the user equipment is to seek session establishment for at least one network slice upon obtaining the registration indication indicating that the user equipment is allowed registration for at least one network slice of the one or more network slices.

10. The media of claim 9, wherein the user equipment is allowed registration with a particular network slice of the one or more network slices based on determining that there is each of available registration capacity, available session capacity, and available bit rate capacity for the particular network slice for the user equipment.

11. The media of claim 9, wherein the registration indication for each network slice of the one or more network slices is provided via a single registration accept message sent to the user equipment.

12. The media of claim 9, wherein if the user equipment is not allowed registration with a particular network slice, the user equipment is provided a reason indicator indicating a reason that the user equipment is not allowed registration with the particular network slice, and wherein the reason indicator indicates at least one of:

that a registration limit for the particular network slice is reached;

that there is a session limit for the particular network slice is reached; or that there a bit rate limit for the particular network slice is reached.

13. The media of claim 9, wherein for at least one network slice of the one or more network slices at least one of:

a registration capacity for the at least one network slice includes a reserved quota for a particular group of subscribers;

a session capacity for the at least one network slice includes a reserved quota for a particular group of subscribers; or a bit rate capacity for the at least one network slice includes a reserved quota for a particular group of subscribers.

14. An access management element of a mobile network, comprising:

at least one memory element for storing data; and at least one processor for executing instructions associated with the data, wherein executing the instructions causes the access management element to perform operations, comprising:

obtaining a registration request from a user equipment, wherein the registration request is obtained from the user equipment before the user equipment seeks session establishment with the mobile network;

for the registration request that is obtained from the user equipment before user equipment seeks session establishment with the mobile network, determining for each of one or more network slices whether there is each of:

available registration capacity for each network slice for the user equipment based on a registration quota configured for each network slice, available session capacity for each network slice for the user equipment based on a session quota configured for each network slice, and available bit rate capacity for each slice for the user equipment based on a maximum bit rate amount configured for each network slice; and providing, based on the determining, a registration indication to the user equipment for each network slice indicating whether the user equipment is or is not allowed registration for each of the one or more network slices, wherein the user equipment is to seek session establishment for at least one network slice upon obtaining the registration indication indicating that the user equipment is allowed registration for at least one network slice of the one or more network slices.

15. The access management element of claim 14, wherein the user equipment is allowed registration with a particular network slice of the one or more network slices based on determining that there is each of available registration capacity, available session capacity, and available bit rate capacity for the particular network slice for the user equipment.

16. The access management element of claim 14, wherein the registration indication for each network slice of the one or more network slices is provided via a single registration accept message sent to the user equipment.

17. The access management element of claim 14, wherein if the user equipment is not allowed registration with a particular network slice, the user equipment is provided a reason indicator indicating a reason that the user equipment is not allowed registration with the particular network slice.

18. The access management element of claim 17, wherein the reason indicator indicates at least one of:

that a registration limit for the particular network slice is reached;

that there is a session limit for the particular network slice is reached; or that there a bit rate limit for the particular network slice is reached.

19. The access management element of claim 14, wherein for at least one network slice of the one or more network slices at least one of:

a registration capacity for the at least one network slice includes a reserved quota for a particular group of subscribers;

a session capacity for the at least one network slice includes a reserved quota for a particular group of subscribers; or a bit rate capacity for the at least one network slice includes a reserved quota for a particular group of subscribers.

20. The access management element of claim 14, wherein the access management element is an Access and Mobility Management Function (AMF).

* * * * *